US 9,188,386 B2

(12) United States Patent
Fujita et al.

(10) Patent No.: US 9,188,386 B2
(45) Date of Patent: Nov. 17, 2015

(54) METHOD OF DRYING COATING FILM FORMED ON PET FILM SURFACE AND COATING FILM DRYING FURNACE

(71) Applicant: NGK Insulators, Ltd., Nagoya-Shi (JP)

(72) Inventors: Yuuki Fujita, Nagoya (JP); Yoshio Kondo, Nagoya (JP); Michiro Aoki, Obu (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/856,701

(22) Filed: Apr. 4, 2013

(65) Prior Publication Data
US 2013/0219738 A1 Aug. 29, 2013

Related U.S. Application Data

(63) Continuation of application No. PCT/JP2012/084113, filed on Dec. 28, 2012.

(30) Foreign Application Priority Data

Jan. 23, 2012 (JP) ................................. 2012-010620
Mar. 27, 2012 (JP) ................................. 2012-071009

(51) Int. Cl.
F26B 3/34 (2006.01)
F26B 7/00 (2006.01)
(Continued)

(52) U.S. Cl.
CPC .............. *F26B 3/343* (2013.01); *B05D 3/0263* (2013.01); *B05D 3/0426* (2013.01); *B05D 7/04* (2013.01); *B28B 1/30* (2013.01); *C09D 5/00* (2013.01)

(58) Field of Classification Search
CPC ............................... B05B 3/0227; F26B 3/343

USPC .............. 34/44–447, 611; 359/891; 106/310; 427/532–540, 541, 542, 543–560, 316
See application file for complete search history.

(56) References Cited

U.S. PATENT DOCUMENTS 3,900,959 A * 8/1975 Breschi et al. ................... 34/639
4,501,072 A * 2/1985 Jacobi et al. ..................... 34/267
(Continued)

FOREIGN PATENT DOCUMENTS

CN 101690926 A 4/2010
DE 103 52 184 A1 6/2005
(Continued)

OTHER PUBLICATIONS

Chinese Office Action, Chinese Application No. 201280003396.4, dated Oct. 8, 2014 (7 pages).
(Continued)

*Primary Examiner* — Kenneth Rinehart
*Assistant Examiner* — John McCormack
(74) *Attorney, Agent, or Firm* — Burr & Brown, PLLC

(57) ABSTRACT

A method of drying a coating film formed on a surface of a PET film includes radiating an infrared ray having a dominant wavelength of 3.5 μm or less from an infrared heater onto a PET film on whose surface the coating film containing water or an organic solvent having an absorption spectrum of 3.5 μm or less has been formed, where the infrared heater has a structure such that an outer circumference of a filament is covered with a protection tube, and a partition wall for forming a flow passageway of a cooling fluid that restrains rise in temperature of a heater surface is provided in a space surrounding this protection tube, and bringing cooling air into contact with the surface of the PET film/coating film has been formed, so as to dry the PET film at a temperature lower than a glass transition point of the PET film.

6 Claims, 5 Drawing Sheets

(51) Int. Cl.
*B28B 1/30* (2006.01)
*B05D 3/02* (2006.01)
*B05D 3/04* (2006.01)
*B05D 7/04* (2006.01)
*C09D 5/00* (2006.01)

(56) References Cited

U.S. PATENT DOCUMENTS

| | | | | |
|---|---|---|---|---|
| 5,319,861 | A * | 6/1994 | Tate | 34/267 |
| 5,517,338 | A * | 5/1996 | Vaughn et al. | 359/15 |
| 6,399,955 | B1 * | 6/2002 | Fannon | 250/504 R |
| 7,441,915 | B2 * | 10/2008 | Shouse et al. | 362/96 |
| 2005/0163937 | A1 | 7/2005 | Hansz et al. | |
| 2007/0221024 | A1 * | 9/2007 | Negishi et al. | 83/170 |
| 2008/0253060 | A1 * | 10/2008 | Ito et al. | 361/321.4 |
| 2010/0103371 | A1 * | 4/2010 | Sarver et al. | 351/165 |

FOREIGN PATENT DOCUMENTS

| | | |
|---|---|---|
| JP | 01-079581 A1 | 3/1989 |
| JP | 07-251411 A1 | 10/1995 |
| JP | 09-103730 A1 | 4/1997 |
| JP | 2001-012848 A1 | 1/2001 |
| JP | 2005-526592 A1 | 9/2005 |
| JP | 2006-226629 A1 | 8/2006 |
| WO | 2004/004929 A1 | 1/2004 |

OTHER PUBLICATIONS

International Search Report and Written Opinion dated Jan. 29, 2013 (with English translation).

* cited by examiner

METHOD OF DRYING COATING FILM FORMED ON PET FILM SURFACE AND COATING FILM DRYING FURNACE

BACKGROUND OF THE INVENTION

1. Field of the Invention

The present invention relates to a method of drying a coating film formed on a PET film surface and a coating film drying furnace.

2. Description of Related Art

In a process of manufacturing an electronic component having a multiple-layer structure, such as an MLCC (multiple-layer ceramic capacitor), a chip inductor, or an LTCC (low-temperature co-fired ceramic), a technique of forming a coating film containing a ceramic powder or metal powder, an organic binder, and an organic solvent on a surface of a base film, peeling the coating film off from the base film after drying the film, and stacking the film is adopted, as shown, for example, in JP 07-251411 A. As this base film, a PET film being excellent in strength and inexpensive is widely used.

In order to enhance the productivity of this drying step, an infrared heater or a warm air is generally used as heating means. However, by such a conventional method, the base film that has been expanded by being heated during the drying shrinks in the cooling step after the drying, whereby a compression stress is generated in the coating film formed on the surface thereof. The coating film that has received the compression stress is deformed when peeled off from the base film, thereby causing a problem of decrease in dimension precision in the stacking step. Also, when the drying temperature is lowered in order to avoid this problem, it will take a long period of time until the drying is completed, thereby leading to decrease in productivity.

SUMMARY OF THE INVENTION

Thus, an object of the present invention is to solve the aforementioned problems of the prior art and to provide a method of drying a coating film formed on a surface of a PET film and a coating film drying furnace that can dry a coating film containing water or an organic solvent formed on a surface of a base film in a shorter period of time than by a conventional method and without generating a compression stress in the dried thin film.

In order to solve the aforementioned problems, the present invention according to a first aspect includes radiating an infrared ray having a dominant wavelength of 3.5 µm or less from an infrared heater onto a PET film on whose surface the coating film containing water or an organic solvent having an absorption spectrum of 3.5 µm or less has been formed, where the infrared heater has a structure such that an outer circumference of a filament is covered with a protection tube, and a partition wall for forming a flow passageway of a cooling fluid that restrains rise in temperature of a heater surface is provided in a space surrounding this protection tube, and bringing a cooling air into contact with the surface of the PET film on which the coating film has been formed, so as to dry the PET film at a temperature lower than a glass transition point of the PET film.

The present invention according to a second aspect is directed to the method of drying a coating film according to the first aspect, wherein the infrared heater is an infrared heater having a structure such that the outer circumference of the filament is covered with a plurality of tubes that absorb an infrared ray having a wavelength in excess of 3.5 µm, and the flow passageway of the cooling fluid that restrains rise in the heater surface temperature is formed between these plural tubes.

The present invention according to a third aspect is directed to the method of drying a coating film formed on a surface of a PET film according to the first aspect, wherein the coating film is a coating film containing a ceramic powder and is peeled off from the surface of the PET film after being dried.

The present invention according to a fourth aspect is directed to the method of drying a coating film formed on a surface of a PET film according to the first aspect, wherein energy is uniformly dispersed into the coating film without drying the coating film by radiating an infrared ray having a dominant wavelength of 3.5 µm or less only from a back surface side of the PET film after forming the coating film to a thickness of 100 µm to 2 mm on the surface of the PET film, and subsequently, the coating film is dried by radiating an infrared ray having a dominant wavelength of 3.5 µm or less from a front surface side of the PET film on which the coating film has been formed.

The present invention according to a fifth aspect is directed to a coating film drying furnace used in the method of drying a coating film according to the first aspect, wherein a plurality of infrared heaters for radiating an infrared ray having a dominant wavelength of 3.5 µm or less are provided at a suitable interval in a ceiling part of the drying furnace; a plurality of cooling air feeding nozzles for cooling a back surface of the PET film are provided in a floor part of the drying furnace; and the cooling air feeding nozzles are placed at positions that face gap spaces formed between adjacent infrared heaters in the ceiling part.

The present invention according to a sixth aspect is directed to the coating film drying furnace according to the fifth aspect, wherein the cooling air feeding nozzles feed a cooling air in a horizontal direction parallel to the back surface of the PET film.

The present invention according to a seventh aspect is directed to the coating film drying furnace according to the fifth aspect, further including a roll section for paying out the PET film on an entrance side in the furnace, a roll section for taking up the PET film on an exit side in the furnace, and a tension adjusting means for adjusting a tension applied to the PET film between the roll sections.

In the method of drying a coating film formed on a surface of a PET film according to the present invention, an infrared heater having a structure such that an outer circumference of a filament is covered with a protection tube, and a partition wall for forming a flow passageway of a cooling fluid that restrains rise in temperature of a heater surface is provided in a space surrounding this protection tube is used. The infrared heater having this structure can maintain the temperature on the outer surface of the heater to be at a low temperature by means of the cooling fluid despite the fact that the infrared heater can raise the filament temperature and can radiate an infrared ray having a dominant wavelength of 3.5 µm or less. Generally, in an infrared heater, when the filament temperature is raised, the temperature of the protection tube on the outer circumference of the filament also rises, whereby the protection tube on the outer circumference becomes a secondary heating body that radiates an infrared ray of a longer wavelength to raise the temperature within the drying chamber. However, in the present invention, this problem is avoided, so that the temperature rise of the PET film can be prevented.

Therefore, according to the present invention, the water or organic solvent having an absorption spectrum of 3.5 µm or less can be efficiently dried in a short period of time by radiating an infrared ray having a dominant wavelength of 3.5 µm or less onto the coating film formed on the surface of the PET film without raising the temperature within the drying chamber. Moreover, since the PET film is hardly heated by the infrared ray having a dominant wavelength of 3.5 µm or less, the coating film can be dried without heating the PET film. As a result, there will be no heat shrinkage of the PET film after drying as in a conventional case; therefore, a compression stress is not generated in the dried thin film. Also, since the drying can be carried out while maintaining a low temperature, diffusion of the metal powder used in the MLCC or the like can be prevented; therefore, the method is useful also in a step of multiple-layer stacking of the thin film.

In particular, when the PET film is dried while being maintained at a temperature lower than its glass transition point, the influence of the heat shrinkage at the time of cooling can be restrained down to a level practically having no problem. For this purpose, it is preferable to perform cooling of the PET film in combination. In particular, when a cooling air is brought into contact with the surface of the PET film on which the coating film has been formed, the evaporated water or the vapor of organic solvent can be quickly discharged to the outside, so that the efficiency of drying can be further enhanced.

When the coating film formed on the surface of the PET film has a thickness of 100 µm or more, the temperatures of the upper and lower surfaces of the coating film may become nonuniform during the drying step, whereby a strain caused by thermal stress is liable to be generated. In contrast, by first radiating an infrared ray having a dominant wavelength of 3.5 µm or less only from a back surface side of the PET film and subsequently radiating an infrared ray having a dominant wavelength of 3.5 µm or less from a front surface side of the PET film on which the coating film has been formed thereby to dry the coating film as in the invention according to the fourth aspect, energy can be uniformly dispersed into the coating film without drying the coating film at a stage before the start of drying, and the temperature in the film can be made uniform in a state before the start of drying even when the film is formed to have a thickness of 100 µm or more. This allows that a temperature difference is less liable to occur between the upper and lower surfaces of the coating film in the drying process, the thermal stress within the film is reduced, and the phenomenon of generation of strain caused by the thermal stress can be effectively avoided.

In a coating film drying furnace, when the cooling air feeding nozzles of the floor part are placed at positions that face the infrared heaters of the ceiling part, the cooling air feeding nozzles are heated by absorbing the light radiated from the infrared heaters, which may cause secondary radiation of heat into the furnace. In contrast, when the cooling air feeding nozzles are placed at positions that face gap spaces formed between adjacent infrared heaters in the ceiling part as in the invention according to the fifth aspect, the secondary radiation from the cooling air feeding nozzles can be avoided.

DETAILED DESCRIPTION OF THE INVENTION

Hereafter, embodiments of the present invention will be described.

First Embodiment

Figure 1:
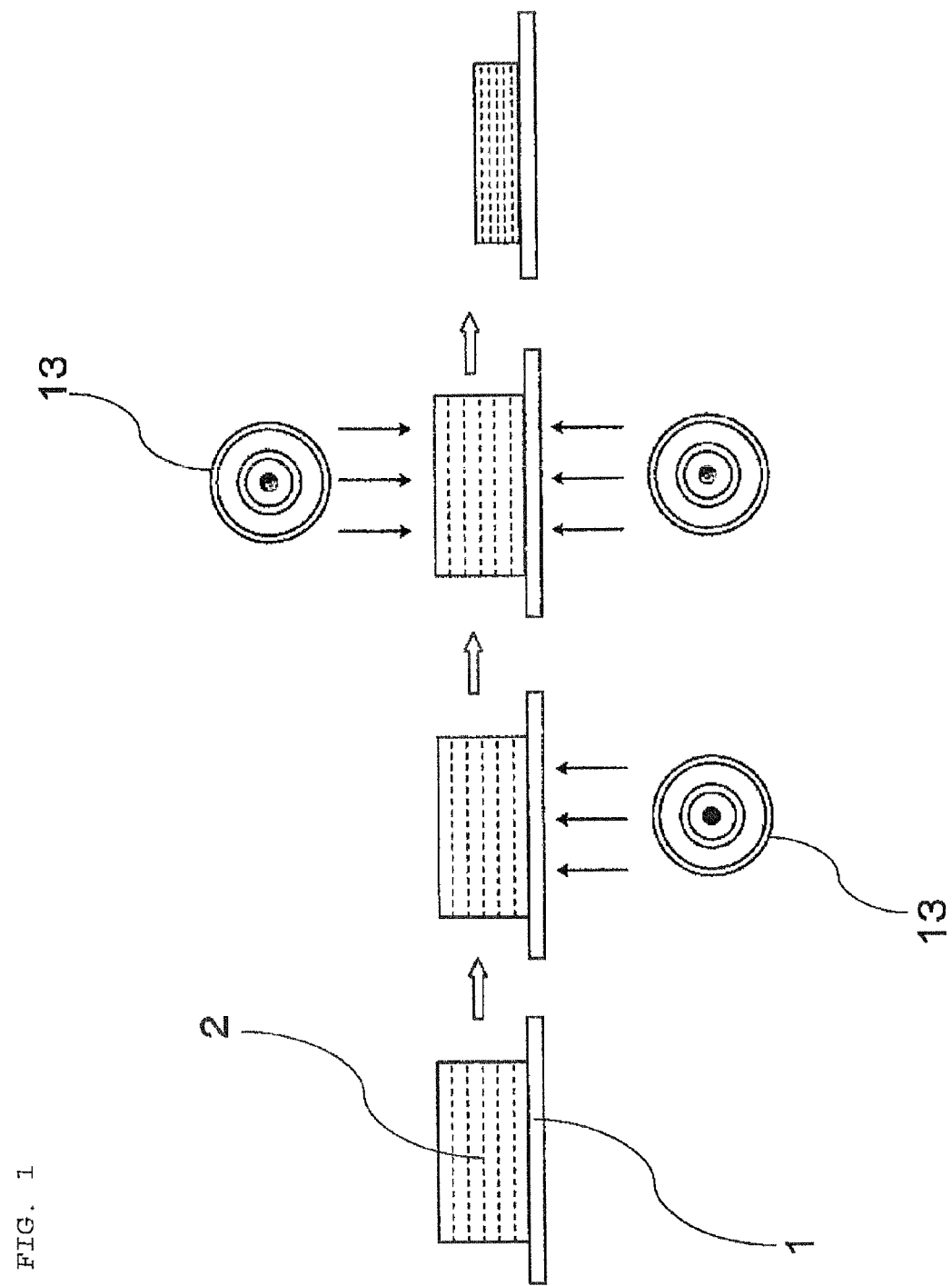
FIG. 1 is a schematic enlarged cross-sectional view of a coating film.

FIG. 1 is a schematic enlarged cross-sectional view of a coating film. Reference numeral 1 denotes a PET film (polyethylene terephthalate film) which is a base film, and reference numeral 2 denotes a coating film formed on the surface thereof. The coating film 2 of the present embodiment is obtained by dispersing a solute such as a barium titanate powder, which is one kind of a ceramic powder, together with an organic binder into an organic solvent. As the organic solvent, terpineol or the like is used. Here, it goes without saying that the kind of these ceramic powder and organic solvent can be changed in accordance with an intended product.

Generally, water or an organic solvent has an absorption spectrum of 3.5 µm or less and therefore absorbs an infrared ray having a dominant wavelength of 3.5 µm or less to be efficiently heated and evaporated, whereas a PET resin has a physical property of being hardly heated by the infrared ray having a dominant wavelength of 35 µm or less. Here, in a state before drying shown on the left side of FIG. 1, the thickness of the PET film 1 of the present embodiment is 10 to 100 µm, and the thickness of the coating film 2 is 1.5 to 2.0 µm.

Figure 2:
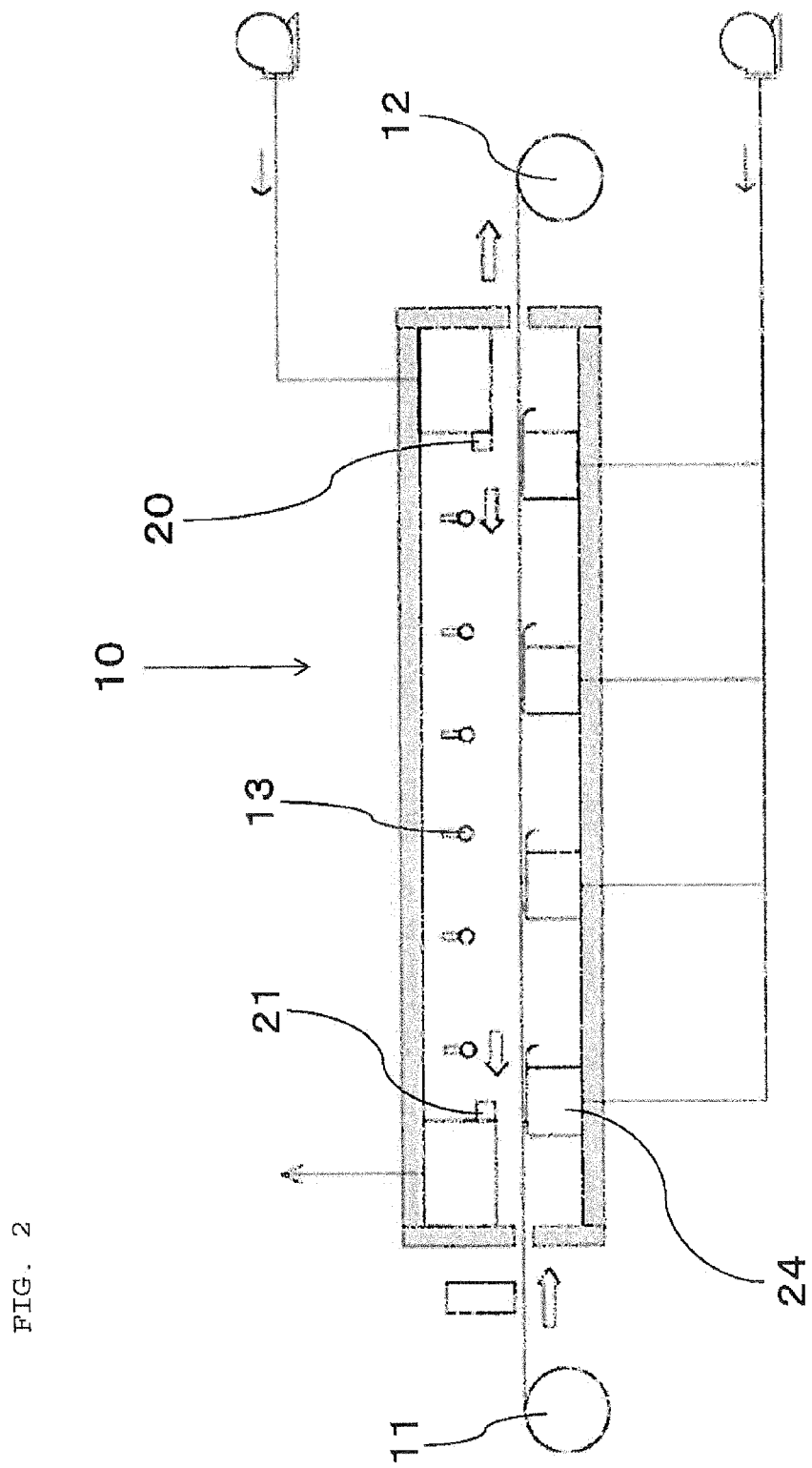
FIG. 2 is a cross-sectional view of a drying furnace.

In the present embodiment, the PET film 1 on which the coating film 2 has been formed is dried by a drying furnace 10 such as shown in FIG. 2. This drying furnace 10 is a furnace of a roll-to-roll type in which the PET film 1 is transported at a predetermined speed between the roll section 11 for pay-out on the entrance side and the roll section 12 for take-up on the exit side. In the present embodiment, the furnace is also provided with a tension adjusting means (not shown) for adjusting a tension applied to the PET film 1 between the roll section 11 for pay-out on the entrance side and the roll section 12 for take-up on the exit side.

In a ceiling part of the drying furnace 10, infrared heaters 13 for radiating an infrared ray having a dominant wavelength of 3.5 µm or less are provided at a suitable interval. In a floor part of the drying furnace 10, cooling air feeding nozzles 24 for cooling a back surface of the PET film 1 are provided. When the cooling air feeding nozzles 24 are placed at positions that face the infrared heaters 13, the cooling air feeding nozzles 24 are heated by absorbing the light radiated from the infrared heaters 13, which may cause secondary radiation of heat into the furnace. In contrast, in the present embodiment, the cooling air feeding nozzles 24 are placed at positions that face gap spaces formed between adjacent infrared heaters 13 in the ceiling part; therefore, the secondary radiation from the cooling air feeding nozzles 24 is avoided.

Here, in the present embodiment, a drying furnace 10 of a continuous type is used; however, the type of the drying furnace is not particularly limited, and a drying furnace of a batch type can be used as well. Also, the drying furnace 10 of a continuous type may have a structure such that the infrared heaters 13 for radiating an infrared ray having a dominant wavelength of 3.5 µm or less are provided at a suitable interval in the floor part at the former stage of the drying furnace 10, and subsequently, the infrared heaters 13 for radiating an infrared ray having a dominant wavelength of 3.5 µm or less are provided at a suitable interval in the floor part and in the ceiling part in the same manner at the latter stage of the drying furnace 10, or the infrared heaters 13 are provided only in the ceiling part at the latter stage of the drying furnace 10.

Figure 3:
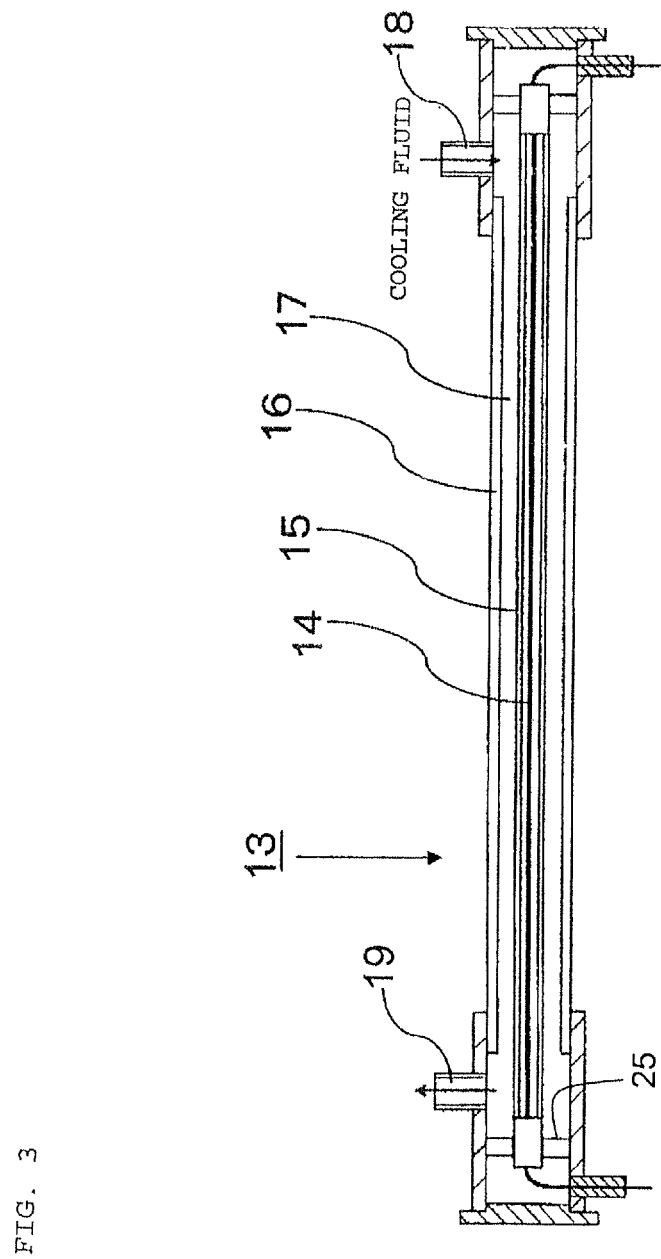
FIG. 3 is a cross-sectional view of an infrared heater used in the present invention.
Figure 4:
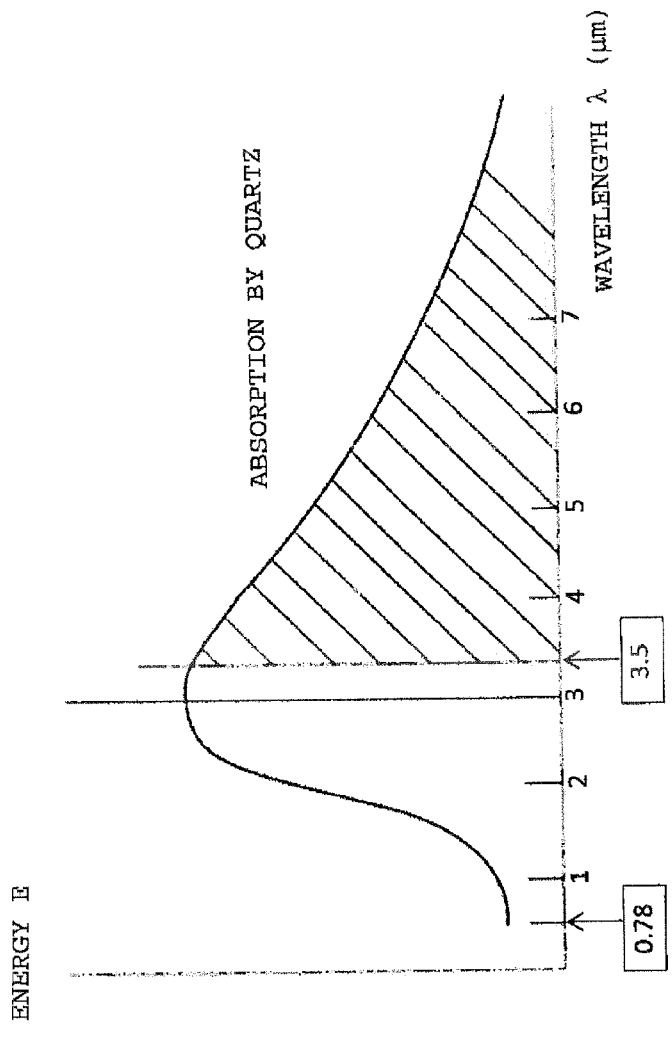
FIG. 4 is a graph showing a radiation spectrum of the infrared heater.

These infrared heaters 13 have a structure such that the outer circumference of a filament 14 is concentrically covered with a plurality of tubes 15, 16 as shown in FIG. 3, and a flow passageway 17 for a cooling fluid is formed between these plural tubes 15, 16. The inside tube 15 is a protection tube for protecting the filament 14, and is a protection tube of an infrared-ray-transmitting type made of quartz glass, borosilicate crown glass, or the like. The filament 14 and tube 15 are fixed in position within the flow passageway 17 by a holder 25 at each end of the filament 14. Also, the outside tube 16 is a tube for letting the cooling fluid flow on the outer circumference of the inside tube 15. These tubes 15, 16 have a function of transmitting an infrared ray having a wavelength of 3.5 μm or less (hereafter referred to as short-pass filter function) and a function of absorbing an infrared ray having a wavelength in excess of 3.5 μm to inhibit transmission of the infrared ray having a wavelength in excess of 3.5 μm (hereafter referred to as high-cut filter function) as shown in FIG. 4. As described above, quartz glass, borosilicate crown glass, or the like can be used; however, in view of heat resistance, heat impact resistance, economic efficiency, and others, it is preferable to use a quartz glass tube.

The filament 14 is energized to be heated to 700 to 1200° C. and radiates an infrared ray whose wavelength has a peak around 3 μm. As described above, quartz glass, borosilicate crown glass, or the like has a function as a short-pass filter and a function as a high-cut filter. For this reason, the tube 15 and the tube 16 selectively transmit the infrared ray having a wavelength of 3.5 μm or less among the electromagnetic waves radiated from the filament 14 and supplies the transmitted infrared ray into the furnace. The infrared ray energy of this wavelength range conforms to the frequency of hydrogen bond between the molecules of the solvent or water in the coating film 2, so that the coating film 2 can be efficiently dried.

On the other hand, the PET film 1 has a physical property of being hardly heated by the near infrared ray having a wavelength of 3.5 μm or less; therefore, the temperature of the PET film 1 does not rise while passing through the drying furnace 10. For this reason, the PET film 1 does not undergo heat shrinkage in the cooling step as in the conventional case.

However, the tube 15 and the tube 16 conversely become an absorber of radiation in the wavelength range in excess of 3.5 μm, and the temperature of the tubes themselves rises by absorption of the infrared ray energy. From the filament 14 at the above-described temperature, a considerable amount of infrared ray in the wavelength range in excess of 3.5 μm is radiated. Consequently, if left as it is, the surface temperature of the tube 16 rises and, as a result, the tube itself becomes a radiator of infrared ray, which may cause secondary radiation of the infrared ray mainly having a wavelength in excess of 3.5 μm into the furnace. The infrared ray having such a large wavelength invites rise in the temperature within the furnace and heats the PET film 1, which may cause a problem similar to that in the conventional case.

Therefore, a fluid for cooling is let to flow through the flow passageway 17 between the tube 15 and the tube 16, whereby the energy of the infrared ray in the longer wavelength range that has once been absorbed by the tube 15 and the tube 16 is transmitted to the aforesaid fluid by being converted in the form of convection heat transfer, thereby to be removed to outside of the system. As a result, the wavelength of the infrared ray eventually supplied into the furnace is restricted to the shorter wavelength range, and also the temperature of the tube 15 and the tube 16 can be maintained to be 200° C. or less, more preferably 150° C. or less, even in a situation in which the filament 14 is continuously energized to be heated at a high temperature. Therefore, the rise in the temperature within the furnace and the heating of the PET film 1 caused by secondary radiation of the infrared ray having a longer wavelength can be prevented with certainty.

Here, the fluid that is supplied to the flow passageway 17 may be, for example, air, inert gas, or the like. In the present embodiment, air is blown into the flow passageway 17 through a fluid supply inlet 18, and the heated air is taken out through a fluid discharge outlet 19.

In this manner, in the present embodiment, by using the infrared heaters 13 having a special structure, the water or the organic solvent having an absorption spectrum of 3.5 μm or less can be efficiently heated and dried while restraining the infrared ray having a wavelength in excess of 3.5 μm that may heat the PET film 1.

Figure 5:
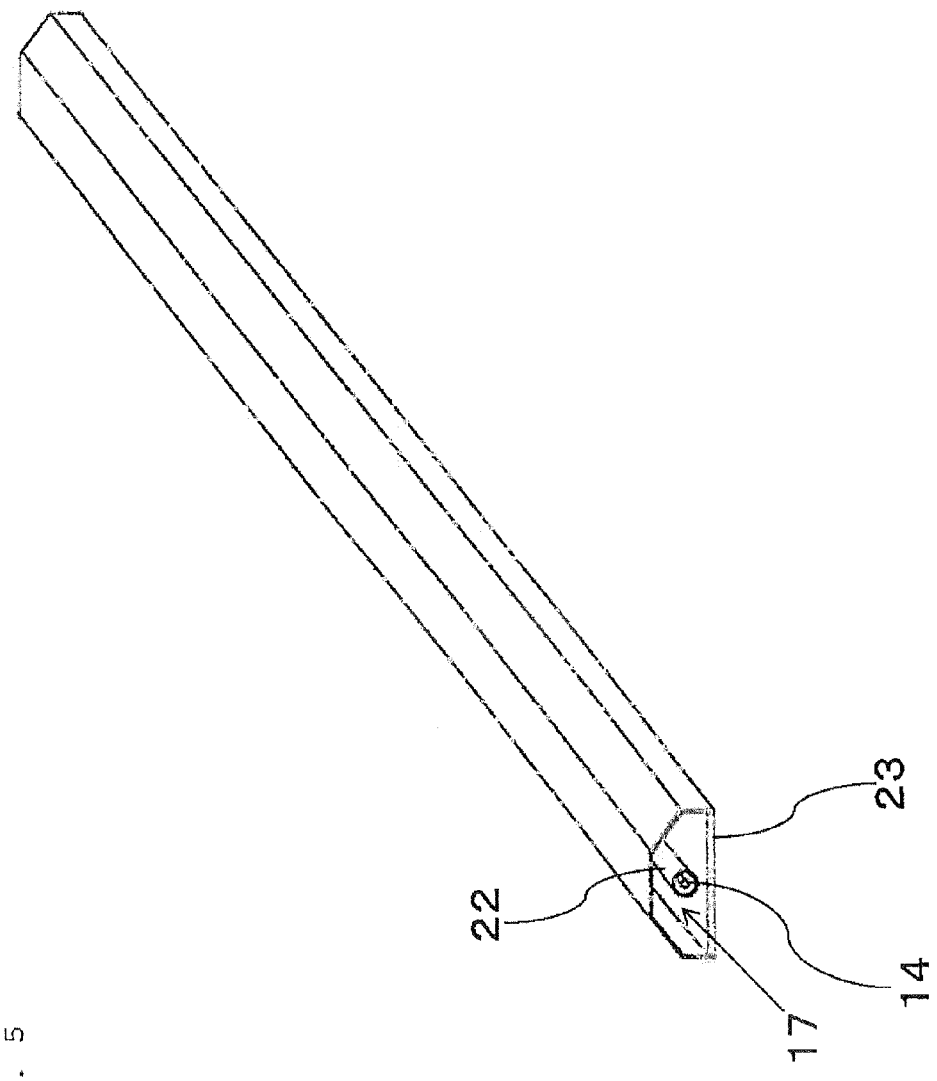
FIG. 5 is an overall perspective view of an infrared heater used in another embodiment.

Here, in the present embodiment, both of the tubes 15, 16 have a function as a short-pass filter and a function as a high-cut filter; however, the present invention is not limited to the present embodiment, and it is sufficient that the furnace has a structure such that, among the electromagnetic waves radiated from the filament 14, the infrared ray having a wavelength of 3.5 μm or less can be selectively transmitted and supplied into the furnace. For example, as shown in FIG. 5, the furnace may have a structure in which the outer circumference of the filament 14 is covered with a protection tube 22, and a partition wall 23 for partitioning between the space surrounding this protection tube 22 and the space within the furnace is provided, where both of the protection tube 22 and the partition wall 23 are provided with a function as a short-pass filter, and at least one of the protection tube 22 and the partition wall 23 is provided with a function as a high-cut filter.

However, since it is difficult to eliminate the infrared ray having a wavelength in excess of 3.5 μm completely, the temperature of the PET film 1 may rise slightly. Therefore, in the present embodiment, an ejection tube 20 and a suction tube 21 for cooling air are disposed respectively near the entrance and near the exit of the drying furnace 10 as shown in FIG. 2, whereby the PET film 1 is cooled by bringing the cooling air into contact along the surface of the PET film 1 on which the coating film 2 has been formed. The temperature of the cooling air ejected from the ejection tube 20 is affected by radiation heat or the like in the furnace after the cooling air is ejected from the ejection tube 20, so that the temperature may fluctuate. However, it is sufficient that the temperature of the cooling air is a temperature lower than the maximum temperature of the coating film in the furnace, and it is particularly preferable that the temperature of the cooling air is not more than "the maximum temperature of the coating film in the furnace −10° C.".

Also, in the present embodiment, the PET film 1 is cooled also from the back surface side by feeding the cooling air in a horizontal direction parallel to the back surface of the PET film 1 from the cooling air feeding nozzles 24 placed in the floor part of the drying furnace 10.

By this cooling air, the inside of the furnace is also cooled, and the temperature of the PET film 1 can be maintained to be a temperature lower than the glass transition point of the PET film 1, for example, 60° C. or less, more preferably 45° C. or less. Moreover, this cooling air also has a function of discharging the vapor of water or the organic solvent evaporated from the surface of the coating film 2 to the outside, so that the drying of the coating film 2 can be further promoted. Here, cooling from the lower surface side of the PET film 1 can be combined as well, of course. In this manner, in order to discharge the vapor containing the organic solvent quickly to the outside, the discharging outlet may be made to have a labyrinth structure.

Generally, it is known that, in order to restrain the deformation of a PET film, the drying temperature is preferably restrained to be low. However, when the drying temperature is lowered, the time needed for drying will be longer. Therefore, the lower limit of the drying temperature was about 90° C. according to a conventional technique of using a general heater. Further, when a tension is applied to the PET film under conditions with a drying temperature of 90° C., the PET film is easily deformed. Therefore, in a conventional case, transportation of the PET film is carried out by mounting the PET film on a belt conveyor so that the tension may not be applied to the PET film, thereby causing a problem of poor heat efficiency for the amount of the heat in the furnace that is deprived of by the belt conveyor.

In contrast, under conditions with a drying temperature of 60° C. or less, the PET film 1 having a width of 200 to 300 mm and a thickness of 50 µm is not deformed even when a tension of about 20 to 50 N is applied thereto. Therefore, according to the present invention in which the PET film 1 can be dried at a low temperature of 60° C. or less as described above, the PET film 1 can be transported while applying a tension thereto by adjusting the pay-out roll 11 on the entrance side and the take-up roll 12 on the exit side without using a belt conveyor, thereby improving the heat efficiency within the drying furnace. Further, because the transportation can be carried out while applying a tension to the PET film 1, flapping is hardly generated in the PET film 1 even when the air speed of the cooling air is raised. Therefore, the air speed of the cooling air can be raised to achieve reduction of the drying time.

The coating film 2 dried in this manner is brought into a state in which the barium titanate powders are strongly bonded with each other by the organic binder as shown on the right side of FIG. 1 and, in the next step, the dried coating film 2 is peeled off from the surface of the PET film 1 and is stacked after passing through conventionally known steps such as cutting. Because the temperature of the PET film 1 in the drying step is maintained to be a temperature lower than the glass transition point thereof, for example, 60° C. or less, more preferably 45° C. or less, the heat shrinkage in the cooling step is negligibly small, and therefore, compression stress is not applied to the coating film 2, whereby deformation after peeling off is prevented. Therefore, the dimension precision in the subsequent stacking step can be maintained to be at a high level.

As described above, according to the present embodiment, the coating film 2 containing water or an organic solvent formed on the surface of the PET film 1, which is a base film, can be dried efficiently in a short period of time and without generating a compression stress on the dried coating film 2. The specific data thereof will be shown in the following Examples.

Examples

The coating film drying speed was measured using an experimental furnace in which infrared heaters were disposed in the ceiling part. The base film that was put to use was a PET film having a thickness of 30 µm, and the base film having a slurry applied to a thickness of 80 µm on one surface thereof was dried. This slurry contains barium titanate, which is a ceramic powder, as a solute, and contains NMP as an organic solvent and PVDF (polyvinylidene fluoride) as an organic binder.

The temperature during the drying was measured with use of a thermocouple thermometer attached to the surface of the coating film, and the drying experiment was carried out by the following two methods under restrictions such that the coating film temperature (which is about the same temperature as the PET film temperature because the coating film is in close adhesion to the PET film) is maintained to be 40° C. or less at all times. In all of the methods, the number N of the test pieces was 2.

The first method is a conventional method using warm air, where the coating film was dried by allowing a warm air of 55° C. to flow into the furnace. According to this method, since the flow rate of air must be restricted to a great extent in order to maintain the coating film temperature to be 40° C. or less at all times, it took 11 minutes to dry the coating film. Here, completion of drying was confirmed by observing the change in color of the coating film by visual inspection.

The second method is the method of the present embodiment, which is a method of using heating with the infrared heaters and cooling with the cooling air in combination shown in FIG. 3. The flow rate of the cooling air is 30 m$^3$/hr, and the temperature thereof is room temperature (25° C.). The filament temperature was set to be 850° C., and the surface temperature of the infrared heaters was maintained to be 100° C. by the cooling fluid (air). By this method, the coating film could be dried in four minutes.

By this experiment, it has been confirmed that, according to the drying method of the present embodiment, while maintaining the coating film temperature to be 40° C. or less, the drying time can be shortened to a great extent as compared with the conventional method.

Second Embodiment

The present invention is not limited to the above-described embodiment 1 and can be applied to a film of a type having a large film thickness in which the thickness of the coating film is 100 µm to 2 mm. Hereafter, this will be described as embodiment 2. The drying furnace 10 to be used is the same as in the embodiment 1.

In the embodiment 2, the thickness of the PET film 1 is 10 to 100 µm, and the thickness of the coating film 2 is 100 µm to 2 mm in a state before drying shown on the left side of FIG. 1.

When the coating film formed on the surface of the PET film has a thickness of 100 µm or more, the temperatures of the upper and lower surfaces of the coating film may become nonuniform during the drying step, whereby a strain caused by thermal stress is liable to be generated. In contrast, in the present embodiment, the coating film is dried by first radiating an infrared ray having a dominant wavelength of 3.5 µm or less only from a back surface side of the PET film on which the coating film has been formed and subsequently radiating an infrared ray having a dominant wavelength of 3.5 µm or less from a front surface side of the PET film on which the coating film has been formed.

In this manner, by first radiating an infrared ray having a dominant wavelength of 3.5 µm or less only from a back surface side of the PET film on which the coating film has been formed, energy can be uniformly dispersed into the coating film without drying the coating film at a stage before the start of drying, whereby the temperature in the film can be made uniform in a state before the start of drying.

Subsequently, by radiating an infrared ray having a dominant wavelength of 3.5 µm or less from a front surface side of the PET film on which the coating film has been formed thereby to dry the coating film, temperature difference is less liable to occur between the upper and lower surfaces of the coating film in the drying process, the thermal stress within the film is reduced, and the phenomenon of generation of strain caused by the thermal stress can be effectively avoided even when the film is formed to have a thickness of 100 μm or more.

DESCRIPTION OF THE REFERENCE SYMBOLS

1 PET film
2 coating film
3 barium titanate powder
10 drying furnace
12 roll section for pay-out
12 roll section for take-up
13 infrared heater
14 filament
15 tube
16 tube
17 flow passageway
18 fluid supply inlet
19 fluid discharge outlet
20 ejection tube
21 suction tube
22 protection tube
23 partition wall
24 cooling air feeding nozzle
25 holder

What is claimed is:

1. A method of drying a coating film formed on a surface of a PET film, comprising:
   radiating in a drying furnace an infrared ray having a dominant wavelength of 3.5 μm or less from an infrared heater onto a PET film on whose surface the coating film containing water or an organic solvent having an absorption spectrum of 3.5 μm or less has been formed, where the infrared heater has a structure such that an outer circumference of a filament is covered with a protection tube, and a partition wall for forming a flow passageway of a cooling fluid that restrains rise in temperature of a heater surface is provided in a space surrounding this protection tube, and
   bringing a cooling air into contact with the surface of the PET film on which the coating film has been formed while applying a tension of around 20-50 N to the PET film, so as to dry the PET film at a temperature lower than a glass transition point of the PET film,
   wherein a temperature of the coating film and a temperature of the PET film are both maintained at a temperature lower than a glass transition temperature of the PET film at all times during the drying of the coating film,
   wherein the infrared heater has a structure such that the outer circumference of the filament is covered with a plurality of tubes that absorb an infrared ray having a wavelength in excess of 3.5 μm, and the flow passageway of the cooling fluid that restrains a rise in temperature of the heater surface is formed between the plurality of tubes, and
   wherein each end of the filament is held by a holder positioned within the flow passageway, and a fluid discharge outlet is positioned inward from one of the holders of the filament so that the fluid supplied into the flow passageway of the cooling fluid is discharged outside of the drying furnace.

2. The method of drying a coating film formed on a surface of a PET film according to claim 1, wherein the coating film contains a ceramic powder and is peeled off from the surface of the PET film after being dried.

3. The method of drying a coating film formed on a surface of a PET film according to claim 1, wherein energy is uniformly dispersed into the coating film without drying the coating film by radiating an infrared ray having a dominant wavelength of 3.5 μm or less only from a back surface side of the PET film after forming the coating film to a thickness of 100 μm to 2 mm on the surface of the PET film, and subsequently, the coating film is dried by radiating an infrared ray having a dominant wavelength of 3.5 μm or less from a front surface side of the PET film on which the coating film has been formed.

4. A coating film drying furnace used in the method of drying a coating film according to claim 1, comprising: a plurality of infrared heaters for radiating an infrared ray having a dominant wavelength of 3.5 μm or less are provided at a suitable interval in a ceiling part of the drying furnace; and
   a plurality of cooling air feeding nozzles for cooling a back surface of the PET film are provided in a floor part of the drying furnace, wherein the cooling air feeding nozzles are placed at positions that face gap spaces formed between adjacent infrared heaters in the ceiling part.

5. The coating film drying furnace according to claim 4, wherein the cooling air feeding nozzles feed a cooling air in a horizontal direction parallel to the back surface of the PET film.

6. The coating film drying furnace according to claim 4, further comprising a roll section for paying out the PET film on an entrance side in the furnace, a roll section for taking up the PET film on an exit side in the furnace, and a tension adjusting means for adjusting a tension applied to the PET film between the roll sections.

* * * * *